United States Patent
Shao et al.

(10) Patent No.: US 11,157,588 B2
(45) Date of Patent: Oct. 26, 2021

(54) INTERFACE SELF-SERVICE METHOD, AND A DEVICE, A COMPUTER SYSTEM AND A STORAGE MEDIUM FOR IMPLEMENTING THE SAME

(71) Applicant: SHENZHEN NEW TREND INTERNATIONAL LOGIS-TECH CO., LTD., Guangdong (CN)

(72) Inventors: Jianfeng Shao, Guangdong (CN); Wei Cui, Guangdong (CN)

(73) Assignee: SHENZHEN NEW TREND INTERNATIONAL LOGIS-TECH CO. LTD, Shenzhen (CN)

( * ) Notice: Subject to any disclaimer, the term of this patent is extended or adjusted under 35 U.S.C. 154(b) by 0 days.

(21) Appl. No.: 17/006,814

(22) Filed: Aug. 29, 2020

(65) Prior Publication Data

US 2021/0064686 A1 Mar. 4, 2021

(51) Int. Cl.
*G06F 16/957* (2019.01)
*G06F 16/958* (2019.01)
*G06F 16/9538* (2019.01)

(52) U.S. Cl.
CPC ........ *G06F 16/9577* (2019.01); *G06F 16/958* (2019.01); *G06F 16/9538* (2019.01); *G06F 16/9574* (2019.01)

(58) Field of Classification Search
CPC .............. G06F 16/9577; G06F 16/958; G06F 16/9538; G06F 16/9574
USPC ....................................................... 715/234
See application file for complete search history.

(56) References Cited

U.S. PATENT DOCUMENTS

| 6,029,175 | A  | * | 2/2000  | Chow     | H04L 29/06 |
| 7,835,989 | B1 | * | 11/2010 | Hendricks | H04N 21/488 |
|           |    |   |         |           | 705/50 |
| 8,082,491 | B1 | * | 12/2011 | Abdelaziz | G06F 16/9537 |
|           |    |   |         |           | 715/234 |
| 8,296,446 | B2 | * | 10/2012 | Pedersen | H04L 67/14 |
|           |    |   |         |           | 709/228 |
| 2005/0149726 | A1 | * | 7/2005 | Joshi | G06F 21/53 |
|           |    |   |         |           | 713/164 |

(Continued)

FOREIGN PATENT DOCUMENTS

| CN | 105610909 A | 5/2016 |
| CN | 107959727 A | 4/2018 |

OTHER PUBLICATIONS

Cody Arsenault; HTTP Cache Headers—A Complete Guide; May 24, 2018; keycdn.com; pp. 1-8.*

*Primary Examiner* — Andrew R Dyer (57) ABSTRACT

An interface self-service method, an apparatus, a computer device and a non-transitory storage medium for implementing the same. The interface self-service method includes: installation of a self-hosted server in a local device; installation of an interface webpage in the self-hosted server in the form of a webpage expansion package; installation of an interface function in the self-hosted server in the form of a function expansion package; confirmation of an access request when the self-hosted server receives the access request from a local browser; if the access request is an interface webpage request, a corresponding interface webpage is returned to the local browser according to the webpage expansion package; and if the access request is an interface function request, a corresponding interface function of the function expansion package is accessed.

8 Claims, 5 Drawing Sheets

(56) References Cited

U.S. PATENT DOCUMENTS

| | | | |
|---|---|---|---|
| 2006/0015571 A1* | 1/2006 | Fukuda | H04L 67/20 709/217 |
| 2008/0027898 A1* | 1/2008 | Matsuo | H04L 67/288 |
| 2012/0203880 A1* | 8/2012 | Kluyt | G06F 9/54 709/223 |
| 2013/0080281 A1* | 3/2013 | Arunachalam | G06Q 20/04 705/26.1 |
| 2014/0365683 A1* | 12/2014 | Bergman | G06F 16/9574 709/238 |
| 2017/0351437 A1* | 12/2017 | Marinescu | G06F 3/067 |

* cited by examiner

INTERFACE SELF-SERVICE METHOD, AND A DEVICE, A COMPUTER SYSTEM AND A STORAGE MEDIUM FOR IMPLEMENTING THE SAME

CROSS-REFERENCE TO RELATED APPLICATIONS

This application claims the benefit of priority from Chinese Patent Application No. 201910810522.0, filed on Aug. 29, 2019. The content of the aforementioned applications, including any intervening amendments thereto, is incorporated herein by reference in its entirety.

TECHNICAL FIELD

This application relates to interface services, and more particularly to an interface self-service method, a device, a computer system and a storage medium for implementing the same.

BACKGROUND

Since a software is commonly used on many types of devices (such as computers, tablets, and various mobile phones), the software terminal needs to support diverse operating environments at the same time. Two solutions are used to satisfy such need. In the first solution, a framework supported by a hardware is used to develop applications. For example, a native application can be developed on a mobile phone by using a framework supported by the mobile phone; and a Windows™-supported native application can be developed on a computer running Windows™. This solution has adaptability to the equipment platform, and can achieve the highest operating efficiency and realize all hardware functions. However, it is necessary to develop a native program for each hardware separately, and a multi-platform support requires repeated developments. The second solution is to employ a unified webpage program to develop an application for all clients, which can be compatible with all access terminals by using a set of webpages under the device restrictions. Unfortunately, it cannot make good use of the function and performance of the hardware (local-specific hardware), and for some functions, the development workload using the webpage is larger than that using a native program alone.

SUMMARY

An object of the present application is to provide an interface self-service method, and a device, a computer system and a non-transitory storage medium for implementing the same to reduce the workload of repeated development, and realize the multi-platform client features under the premise of reducing the difficulty and workload of single development.

In a first aspect, the present application provides an interface self-service method, comprising:
installing a self-hosted server in a local device;
installing an interface webpage in the self-hosted server in the form of a webpage expansion package; and installing an interface function in the self-hosted server in the form of a function expansion package; and
confirming a type of an access request when the self-hosted server receives the access request from a local browser;

if the access request is an interface webpage request, returning a corresponding interface webpage to the local browser according to the webpage expansion package; and
if the access request is an interface function request, accessing a corresponding interface function of the function expansion pack.

In a second aspect, the present application provides an apparatus for interface self-service, comprising:
a self-hosted server installation module for installing a self-hosted server in a local device;
an expansion package installation module for installing an interface webpage in the self-hosted server in the form of a webpage expansion package and installing an interface function in the self-hosted server in the form of a function expansion package;
an access request confirmation module for confirming a type of an access request when the self-hosted server receives the access request from a local browser;
a webpage expansion module for returning a corresponding interface webpage to the local browser according to the webpage expansion package if the access request is an interface webpage request; and
a function expansion module for accessing a corresponding interface function of the function expansion package if the access request is an interface function request.

In a third aspect, the application provides a computer device, comprising: a memory, a processor, and a computer program that is stored in the memory and can be run on the processor; wherein the processor executes the computer program to implement the interface self-service method provided in the first aspect.

In a fourth aspect, the application provides a non-transitory computer-readable storage medium having thereon stored a computer program. The computer program, when executed by a processor, causes the processor to perform the interface self-service method according to the first aspect.

The present application discloses an interface self-service method, including: installing a self-hosted server in a local device; installing an interface webpage in the self-hosted server in the form of a webpage expansion package; installing an interface function in the self-hosted server in the form of a function expansion package; confirming a type of an access request when the self-hosted server receives the access request from a local browser; if the type of the access request is a request for the interface webpage, returning a corresponding interface webpage to the local browser according to the webpage expansion package; and if the type of the access request is a request for the interface function, accessing a corresponding interface function of the function expansion package. In the present application, a local client development method is implemented by the self-hosted server to realize some functions that are usually difficult or require a large cost to implement on a webpage, or need to be implemented repeatedly on different webpages. The application also provides an interface self-service apparatus, a computer device and a non-transitory computer-readable storage medium for implementing the above method.

BRIEF DESCRIPTION OF THE DRAWINGS

The technical solutions of the invention will be more clearly illustrated below with reference to the drawings and embodiments. Obviously, the drawings merely illustrate some embodiments of the application, and other drawings obtain by those skilled in the art based on the content of the invention without sparing any creative effort should fall within the scope of the invention.

DETAILED DESCRIPTION OF EMBODIMENTS

The technical solutions of the invention will be clearly and completely described below with reference to the drawings and embodiments. Obviously, the following embodiments are merely some rather than all of the embodiments of the present application. Other embodiments obtained by those skilled in the art based on the content disclosed herein without sparing creative effort should fall within the scope of the application.

It should be understood that the terms "comprise" and "include" used herein indicate the existence of the described features, entireties, steps, operations, elements and/or components, but do not exclude the existence or addition of one or more of other functions, entireties, steps, operations, elements, components and/or a combination thereof.

It should also be understood that the terms used herein are only illustrative of the embodiments and are not intended to limit the present application. As used herein, unless otherwise specified, the terms "a", "an" and "the" are intended to include plural forms.

It should be understood that the term "and/or" used herein refers to any combination of one or more of the listed items.

Figure 1:
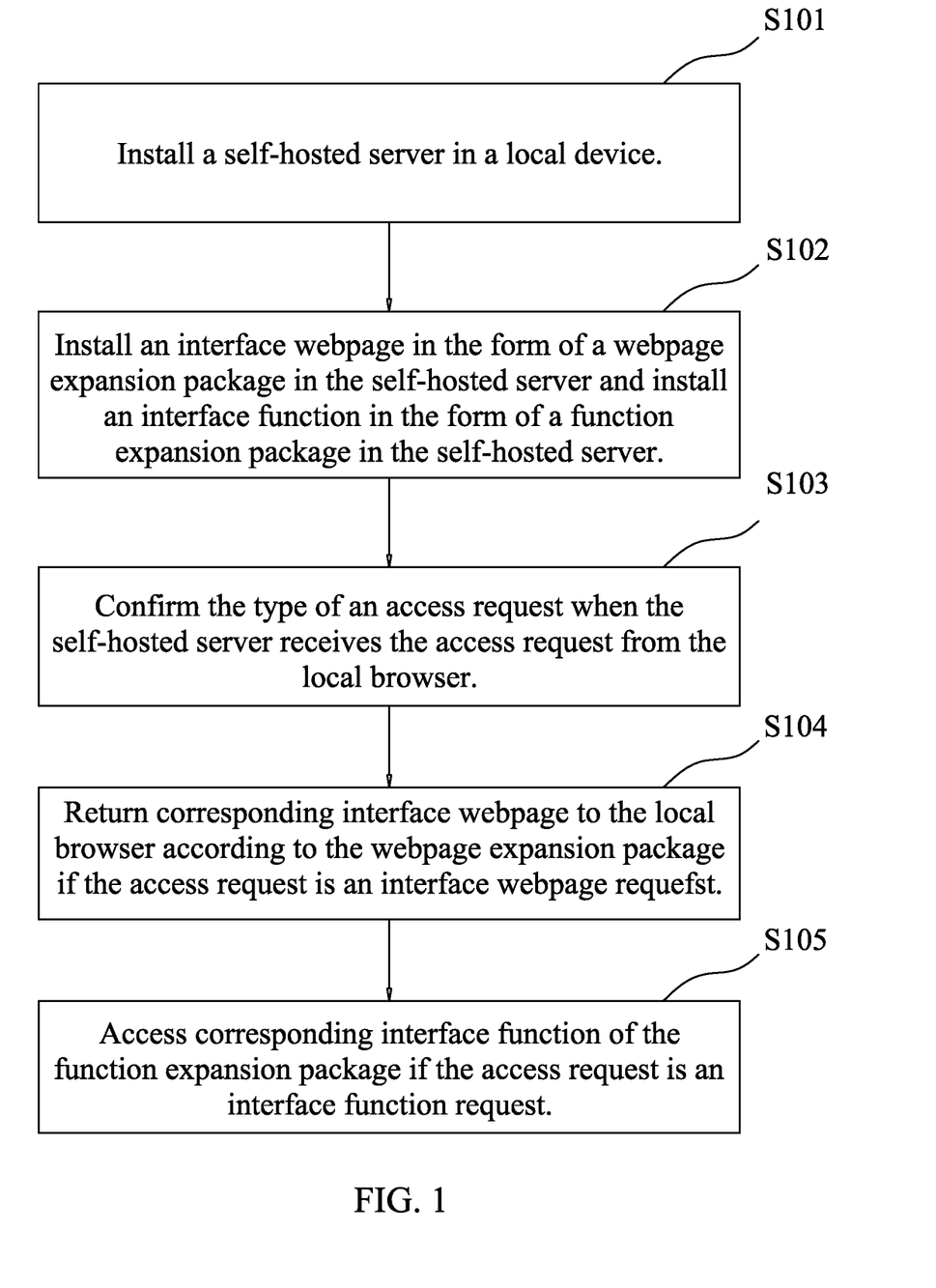
FIG. 1 is a flowchart of an interface self-service method in accordance with an embodiment of the present application.

As shown in FIG. 1, this application provides an interface self-service method, which is performed as follows.

S101. Installation of a self-hosted server in a local device

A self-hosted server is installed in a local device. A browser assembly can be packaged in the self-hosted server to access the self-hosted server. Optionally, the access to the self-hosted server can also be performed by using a browser of the local device. The packaged browser and the browser coming with the local device both can be called a local browser to realize the access to the self-hosted server.

The self-hosted server and the local browser can be developed using a local native framework. The local browser directly accesses an access interface provided by the self-hosted server. In some embodiments, the local browser does not need to access a server other than the local device, and the local browser and the self-hosted server can transmit data in the JSON data format.

S102. Installation of an interface webpage in the self-hosted server in the form of a webpage expansion package and installation of an interface function in the self-hosted server in the form of a function expansion package Specifically, the interface webpage and the interface function can be installed in a program where the self-hosted server is located in the form of the webpage package, and provided to the browser through the self-hosted server on demand.

Furthermore, the webpage expansion package is used to store static webpage files, script files (such as Javascript™) and related resource files (such as multimedia files and style sheet files) originally stored in a remote server, and contains service address path information. The content of the aforementioned webpage expansion package is pre-installed in the local area of a visitor to reduce an access frequency and data volume between the local device and the remote server, improving the local access speed. Therefore, the webpage expansion pack mainly solves the indexing problem of files, and the solution to the indexing problem will be described in detail later. The webpage expansion package can be installed at any time and then indexed by the self-hosted server, which means that the webpage expansion package can be installed in the self-hosted server before or after the self-hosted server is installed on the local device. The self-hosted server does not parse the contents of the webpage expansion package files, and only provides the original files to the local browser.

The function expansion package is required to provide functions that need to be implemented by code. Due to a limitation of mobile clients (that is, the local device is a mobile client device), these functions need to be installed in the self-hosted server before the installation of the self-hosted server, and cannot be adjusted later. The self-hosted server needs to be reinstalled to add, delete or upgrade the function expansion package. For non-mobile clients, the functions can be installed at any time just like the webpage expansion package. The function expansion package can implement those functions that are difficult or impossible to implement on webpages, such as accessing local files, accessing hardware of the local device (such as a camera), caching data required for business, pulling or pushing remote data, and visiting external webpages through channels. In particular, since the self-hosted server is located at the access between the local browser and the remote server, there are two solutions for the local browser to access a webpage that is not located in the self-hosted servers. The first solution is recommended, in which the access to the webpage is performed through an access provided by the function expansion package, and at this time, the local browser only needs to connect to the self-hosted server, and the function expansion package can realize all the functions required for accessing the remote end; in this way, it process controlled accesses to an external network in a business scenario. The second solution is to access an external webpage directly. In this way, the local browser actively establishes a connection with the external, and is not controlled by the self-hosted server, and accordingly, the self-hosted server does not provide services and various auxiliary functions and also does not need the support of the function expansion package.

S103 Confirmation of a type of an access request when the self-hosted server receives an access request from the local browser Different processing operations can be performed according to the type of access requests. For example, when the local browser needs to apply for webpages and resources, the self-hosted server would match the applications in the local webpage expansion package and provides services directly without accessing external resources. In some embodiments, when applying for the resources of the local device through the self-hosted server, such as local file access and local device access, the local browser needs to access corresponding functions of the function expansion package.

S104 Return of a corresponding interface webpage to the local browser according to the webpage expansion package if the access request is an interface webpage request For example, when the local browser applies for webpages and resources, the self-hosted server would match the applications in the local webpage expansion package and provides services directly without accessing external resources.

S105 Access to corresponding interface function of the function expansion package if the access request is an interface function request For example, when the local browser requests data, the self-hosted server may obtain data from an external data server, or may directly obtain data provided internally. In some embodiments, the local browser can temporarily store the data in the self-hosted server for use by other webpages. In some embodiments, the local browser can asynchronously obtain the data from an external data server, through the self-hosted server, which can simplify the webpage development and improve the concurrency, and at the same time, the self-host server can be set to cache the data. In some embodiments, the local browser can asynchronously commit data to an external data server through the self-hosted server, which can simplify the webpage development and improve the concurrency, and at the same time, the self-host server can be set to cache the data. In some embodiments, the local browser can access an external web server through the self-hosted server, and the self-hosted server can be set to cache page resources. In some embodiments, the local browser can obtain status data through the self-hosted server, such as detecting whether the current device is connected to the Internet and obtaining device power information. In some embodiments, the local browser can obtain resources of the local device through the self-hosted server, such as local file access and local device access.

In some embodiments, the self-hosted server is a channel server. All access requests from the local browser pass through the self-hosted server and only pass through the self-hosted server by default. Further, most of business is completed in this self-hosted server. Normally, the self-hosted server only exchanges business data excluding webpages and related resource files with other servers. The local browser cannot work (the webpages cannot be accessed) in the absence of the self-hosted server. Since the server is not a bypass server, there is no need to simulate the same identity that uses the browser on the bypass server, and also no need for the browser to pass in data such as cookies.

Figure 3:
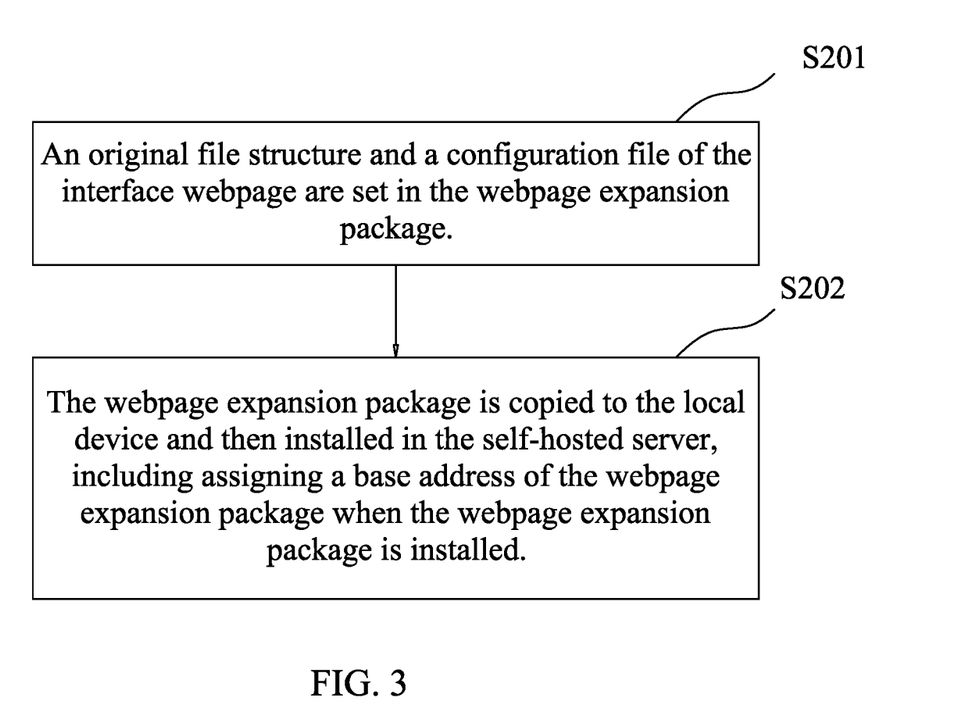
FIG. 3 is a flowchart of installing the interface webpage in the self-hosted server in accordance with an embodiment of the present application.

This application also provides a method of installing the webpage expansion package as shown in FIG. 3, which is specifically illustrated as follows.

S201 An original file structure and a configuration file of the interface webpage are set in the webpage expansion package.

The original file structure includes folders and files of the interface webpage, and the configuration file is mainly used to configure nodes of the files and folders in the original file structure.

S202 The webpage expansion package is copied to the local device and then installed in the self-hosted server.

The webpage expansion package is copied to the local device, and then installed in a management interface of the self-host server.

The step S202 further includes a step of: assigning a base address of the webpage expansion package when the webpage expansion package is installed.

There may be more than one webpage expansion package, and it is necessary to assign a base address for the webpage expansion package to be installed. A listening address of the server, the base address of the webpage expansion package and a node address are combined to form an access address.

Figure 4:
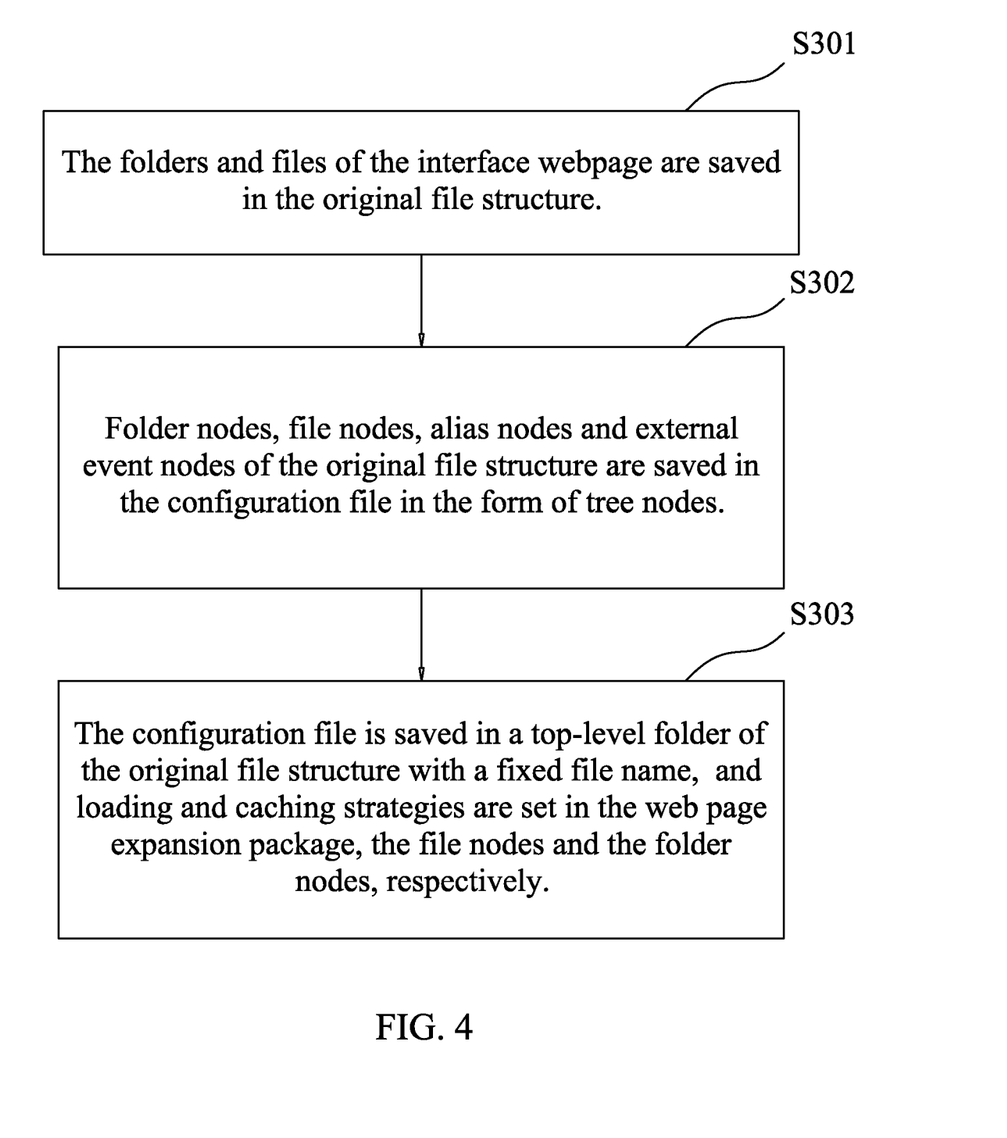
FIG. 4 is a flowchart of setting of the original file structure and the configuration file of the interface webpage in accordance with an embodiment of the present application.

This application also provides a method for generating the webpage expansion package as shown in FIG. 4. The setting of the original file structure and the configuration file of the interface webpage in the webpage expansion package is specifically described as follows.

S301 The folders and files of the interface webpage are saved in the original file structure.

The original file structure saves the folders and files that originally need to be stored in a remote server (the files only include static webpage files and related resource files, and exclude the program files that need to be executed on the server).

S302 Folder nodes, file nodes, alias nodes and external event nodes of the original file structure are saved in the configuration file in the form of tree nodes.

The folder nodes respectively correspond to each folder in the original file structure and can contain any number of any nodes. For example, if there is a folder A in an original directory, a folder node named A should be established; and if there is a folder B under the folder A, a folder node named B should be established under the folder node A.

The file nodes respectively correspond to each file in the original file structure and are stored under the corresponding folder node. For example, if there is a file index.html in the original folder B, a file node named index.html needs to be established under the folder node B.

The alias nodes (also called shortcut nodes) are respectively used for setting an alias for an access path of a file or a folder. The access path may point to a file or a folder. The pointed address should be located in the current webpage expansion package. The access path may also point to another alias node.

The structure of a node is exemplarily shown as follows:
(Root node)
|--Folder A
  |--Folder B
    |--Folder index.html (Access address: /A/B/index.html)
  |--Folder C
    |--Alias x (Access address: /AB/x)
    |--Alias y (Access address: /AB/y)

If the x is set to point to A/B, the access to/A/C/x/index.html is the same as the access to/AB/index.html;

further, if the y is set to point to/A/C/x/index.html, the access to/A/C/y is the same as the access to/AB/index.html.

The external event node is used for requesting other expansion packages to process an event.

The setting of the original file structure and the configuration file of the interface webpage in the webpage expansion package further includes:

setting loading and caching strategies in the webpage expansion package, the file node and the folder node, respectively;

where the loading and caching strategy includes: no caching, caching after the first access, reading and caching when the self-hosted server is started, and inheriting superior settings.

Specifically, in order to improve the loading speed of key files, a loading and caching strategy can be set in the file nodes, and the loading and caching strategy of the file nodes includes no caching, caching after the first access, reading and caching when the server is started, and inheriting the superior settings (default). Meanwhile, in order to facilitate the setting, there are same options in the folder nodes, that is, the loading and caching strategy of the folder nodes also includes: no caching, caching after the first access, reading and caching when the server is started, and inheriting the superior settings (default). The loading and caching strategy of the webpage expansion pack includes no caching (default), caching after the first access, and reading and caching when the server is started. The content of the cached file will be stored in the memory to avoid reading the disk during the access to accelerate the read response.

S303 The configuration file is saved in a top-level folder of the original file structure with a fixed file name.

The configuration file is saved in a top-level folder of the original file structure with a fixed file name, so as to quickly locate a corresponding node. When the webpage expansion pack is installed, a location of the top-level folder should be assigned. The webpage expansion package itself can define some special requests and associate them with an address. When the addresses are accessed, internal event channels of the self-hosted server will be triggered. The internal events can be processed by other expansion packages, and the processing results are returned to the local browser in the form of access results. The self-hosted server is responsible for summarizing and routing these requests according to their names, but is not responsible for parsing and processing the requests.

This application also provides a method for installing the webpage expansion package, which is described as follows.

An event handler is registered for the function expansion package to process event processing requests of other expansion packages.

The registering of event handlers is intended to promote the inter-package collaboration so as to directly process the event processing requests of the other expansion packages (including function expansion packages and webpage expansion packages) through internal mechanisms.

Each expansion package (including webpage expansion package and function expansion package) can choose a registered event handler, and each event handler needs to be associated with an event name. When the node address is accessed, the webpage expansion package requires the local server to sequentially process the event handlers registered with the same event name in all expansion packages (including webpage expansion packages and function expansion packages). The event handler can still request an execution of an event handler with another name. When one event handler has a return value, the return value is returned to the visitor (local browser) as the page content. When there are multiple event handlers, the event handler that returns a result fastest is valid. When there is no event handler associated or no return value, an error message is returned to the visitor (local browser).

The function expansion package is exemplarily a collection function of a main memory database, where the collection function can save multiple records under the same name, which is specifically described as follows.

1. The visitor (local browser, the same hereinafter) inputs parameters value and key to add the value to a set named key through an access address/MemDb/<instance name>/Set/TryAdd.

2. The visitor inputs the parameters value and key to delete the value from the key set through an access address/MemDb/<instance name>/Set/TryRemove.

3. The visitor inputs the parameter key to return all values in the key set through an access address/MemDb/<instance name>/Set/TryGet.

4. The visitor inputs the parameter key to clear all values in the key set through an access address/MemDb/<instance name>/Set/Clear.

In the operations as listed above, the registration of an event handler is also provided. These methods enable that all the function expansion packages and Javascript™ programs in the browser can be conveniently gathered and are usually used to batchwise summarize the data in sub-forms for unified submission.

Another example of the function expansion package is a lock access type of a main memory database, which is usually used for asynchronous read and write access. The details are presented as follows.

1. The visitor inputs a parameter key to prepare a locked variable named key through an access address/MemDb/<instance name>/BlockingValue/TryPrepare.

2. The visitor inputs parameters key and value to set value as a value of the locked variable key and unlock the variable key through an access address /MemDb/<instance name>/BlockingValue/Set.

3. The visitor inputs parameters key, timeOut, and removeAfterGet to attempt to obtain a value of the locked variable key through an access address /MemDb/<instance name>/BlockingValue/TryGet. If the variable has been unlocked, the value of the variable will be returned; otherwise, the value of the variable will be read after the variable is unlocked. If the time of timeOut has been consumed within the waiting period, a timeout status will be returned. If there is a removeAfterGet, the variable will be deleted after the value has been successfully retrived.

4. The visitor inputs the parameter key to delete the locked variable key through an access address/MemDb/<instance name>/BlockingValue/TryRemove.

The registration of an event handler is also provided in the operations as listed above. These methods enable that all the function expansion packages and Javascript™ programs in the browser can be conveniently gathered, which is usually used to get data asynchronously. For example, a QR code scanning program can write a recognized barcode into an assigned locked variable, while a web program will always try to obtain values when the barcode needs to be scanned.

Another example of the function expansion package is an asynchronous acquisition function, which is specifically described as follows:

The visitor, through an access address/AsyncGet/<instance name>/TryStartGet, inputs parameters url, id, memDbKey and timeOut. The function expansion package will try to obtain a remote resource pointed to by the url in the background, and save the remote resource in a main memory database under the name of memDbKey. The parameter id serves as a primary key of query for this task to stop the corresponding task. The function expansion package will always try to obtain the specified resource, and retry when it fails. The process will not be stopped until the resource has been successfully retrieved or the time set by timeOut has been exhausted. If timeOut is not set, the function expansion package will not stop until it succeeds. The visitor can input the parameter id through an access address/AsyncGet/<instance name>/StopGet to make the function expansion package stop the ongoing asynchronous acquisition task assigned by the id. After acquired, the data will be stored in the main memory database.

Figure 5:
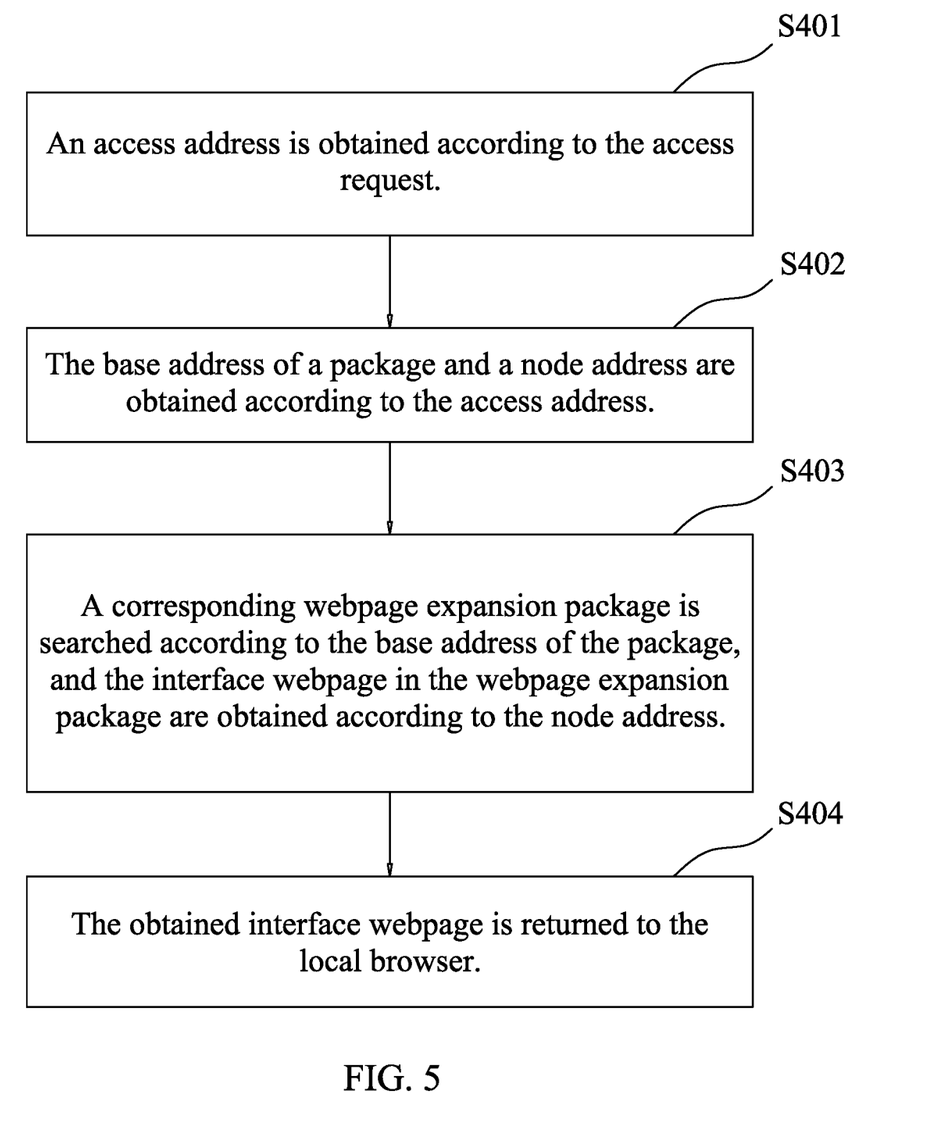
FIG. 5 is a flowchart of returning a corresponding interface webpage to the local browser in accordance with an embodiment of the present application.

This embodiment also provides a method for returning a corresponding interface webpage to the local browser according to the webpage expansion package, as shown in FIG. 5, which is described below in details.

S401. An access address is obtained according to the access request.

The access address is included in the access request, so it can be obtained first.

S402. The base address of a package and a node address are obtained according to the access address.

The access address includes a server monitoring address, a base address of a package and node address, and the latter two can be obtained first.

S403. A corresponding webpage expansion package is searched according to the base address of the package, and the interface webpage in the webpage expansion package are obtained according to the node address.

For example, when the package is installed in the node MyPackage and the server monitoring address is located at http://localhost:8080, the index.html in the webpage expansion package can be accessed through http://localhost:8080/MyPackage/A/B/index.html.

S404. The obtained interface webpage is returned to the local browser.

In some embodiments, the self-hosted server, by local client development, can implement functions that are difficult to implement on a webpage, or require a relatively high cost to implement, or need to be implemented repeatedly on different webpages. For example: 1. Disconnection support. Through a specific Javascript™ supported interface, the self-hosted server is allowed to pull remote data in advance to save it in the self-hosted server, and the self-hosted server is also allowed to temporarily store information submitted by a webpage that needs to be uploaded to the server, which enables that there is no need to excessively implement the business function of dealing with the failure in network coverage during the webpage development. 2. Local data caching. By temporarily storing the data submitted by webpages, it is convenient to share data between different webpages. 3. Local resource support. Due to security restrictions, it is not allowed to traverse the local file structure and other local devices (such as code-scanning recognition) in the browser. The webpage can support this function by coding in the self-hosted server and then providing the interface to the local web page. 4. Local cache support. When it is required to access webpages and data of a server outside the device, the browser will directly request access to the self-hosted server, and the self-hosted server will act as a proxy to cache the pages and data as needed after accessed. 5. Cross-site data fusion. Since the browser only applies for accesses to the same server (self-hosted server), the browser considers the webpage to come from the same server in terms of security settings, which reduces the difficulty of security evasion during cross-site access. The fusion deployment of server (deploying sensitive data in local clients, deploying a large amount of basic data in the cloud, and using other external servers to provide supporting data at the same time) can greatly reduce the logic difficulty of data processing in the webpage development. The self-hosted server still needs to be developed for different devices, but it does not involve business logic. Therefore, it is only required to perform development once for each platform without need to develop software for each business function separately. Furthermore, the self-hosted server does not involve the display of details. Therefore, the development is only required to be performed once for each platform without the need to adapt to screen size and operation method.

Example 1 (Camera)

It is a relatively simple process that a mobile application calls the camera through a native program to recognize a barcode image and extract data. However, this process fails to be completed through webpages in the mobile browser due to security restrictions. The self-hosted server of the application provides three operations through the function module supported by scanning codes.

1. Starting the code scanning function (the parameter is a function description)

An interface is opened at the front of a screen. The camera is turned on, to prompt the user to enter the code scanning function and display the function description provided by the user.

2. Attempting to acquire barcode information by scanning (the parameter is a timeout)

The barcode data from the camera is attempted to be parsed continuously within the timeout. The barcode information is immediately returned if the barcode data is successfully parsed, otherwise, the parsing will not be stopped until it times out, and a timeout status is returned. Moreover, the user may choose to cancel the scanning in the interface, and at this time, a cancel status is returned.

3. Closing the code scanning function

The code scanning interface is shut down and the camera is turned off.

The user only needs to call the first function interface in the self-hosted server through Javascript™ in a webpage, then call the second function interface repeatedly, and call the third function interface when the code is successfully scanned or the user gives up to realize the function of inputting the scanned information into the webpage.

Example 2 (File System)

It is forbidden to directly access local disk resources through webpages due to the security restrictions for the browser. However, basic operations such as folder browsing, file reading, and file saving can be implemented through a code interface in the self-hosted server, which is convenient for users to complete business operations on the same webpage without the need to repeatedly select files in pop-up windows.

Example 3 (Data Persistence Across Webpages)

In an order-entry scenario, the user usually enters the header data and then repeatedly enters the detailed data. This process may require the frequent switching of webpages. Therefore, the webpage is needed to have a function of temporarily storing the data. The webpage can save the data in the self-hosted server and directly request the self-hosted server to format the data and submit it to the remote data server at the end of the saving. Optionally, the webpage would also pull the complete data, organize and submit it to the remote data server.

Example 4 (Local Data Cache)

In order to ensure the data security, the direct connection of equipment to the wide area network is usually forbidden under an industrial environment, and all business data is transmitted via WIFI in the factory network. However, WIFI may not be available in all workplaces due to the restrictions of cost, technology and deployment.

For example, when the user makes inventory in the warehouse, there may be WIFI blind spots inside the warehouse. Through the implementation of the technical solutions provided herein, after getting the inventory task, a local device directly requests all data about the inventory through the webpage and temporarily stores it in a self-hosted server, so that the inventory can still be done without WiFi connection. Moreover, there is no need of a lot of code to realize the cache function because it does not need to temporarily store the data in the browser. The inventory data is also stored in the self-hosted server during the inventory. After the inventory is completed, the device is brought back to the area covered by WIFI to complete the submission.

Figure 2:
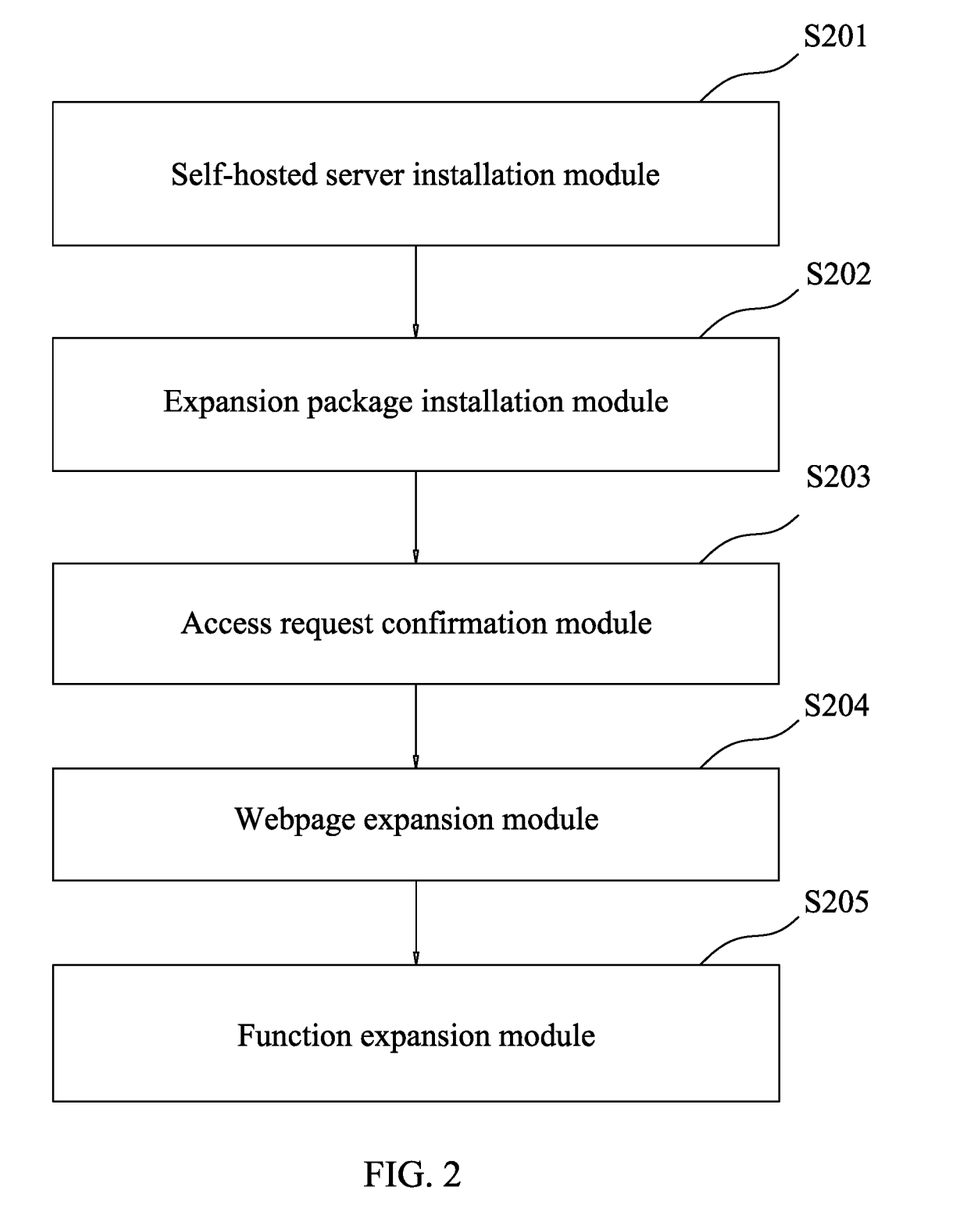
FIG. 2 is a schematic diagram of an interface self-service apparatus in accordance with an embodiment of the present application.

This application also provides an interface self-service apparatus, which is schematically shown in FIG. 2.

The apparatus for interface self-service includes:

a self-hosted server installation module 201 for installing a self-hosted server in a local device;

an expansion package installation module 202 for installing an interface webpage in the self-hosted server in the form of a webpage expansion package and installing an interface function in the self-hosted server in the form of a function expansion package;

an access request confirmation module 203 for confirming a type of an access request when the self-hosted server receives the access request from a local browser;

a webpage expansion module 204 for returning a corresponding interface webpage to the local browser according to the webpage expansion package if the access request is an interface webpage request and a function expansion module 205 for accessing a corresponding interface function of the function expansion package if the access request is an interface function request.

Furthermore, the expansion package installation module 202 includes:

an interface webpage file setting unit for setting an original file structure and a configuration file of the interface webpage in the webpage expansion package; and an interface webpage expansion package installation unit for copying the webpage expansion package to a local device and installing the webpage expansion package in the self-hosted server.

The interface webpage file setting unit includes:

a first saving subunit for saving folders and files of the interface webpage in the original file structure;

a second saving subunit for saving folder nodes, file nodes, alias nodes and external event nodes of the original file structure in the configuration file in the form of tree nodes; and a third saving subunit for saving the configuration file in a top-level folder of the original file structure with a fixed file name.

Furthermore, the interface webpage expansion package installation unit includes an assign subunit for assigning a base address of a package when the webpage expansion package is installed.

The webpage expansion module 204 includes:

a first address acquisition unit for acquiring an access address according to the access request;

a second address acquisition unit for acquiring the base address of the package and a node address according to the access address;

an interface webpage acquisition unit for searching for a corresponding webpage expansion package according to the package base address, and obtaining the interface webpage in the webpage expansion package according to the node address; and an interface webpage returning unit for returning the obtained interface webpage to the local browser.

The interface webpage file setting unit further includes:

a loading and caching strategy setting subunit for setting loading and caching strategies in the web page expansion package, the file nodes and the folder nodes, respectively;

where the loading and caching strategies includes: no caching, caching after the first access, reading and caching when the self-hosted server is started, and inheriting settings of a superior.

The expansion package installation module 202 further includes a register unit for registering an event handler for the function expansion package, so as to process event processing requests of other expansion packages through the event handler.

The function expansion module 205 is used to access local files and hardware of local device, cache data required for business, pull or push remote data and access external webpages through channels.

A non-transitory computer-readable storage medium having thereon stored a computer program is also provided in the present application. The computer program can be executed to implement the above method. The storage medium is a USB disk, a mobile hard disk, a read-only memory (Read-Only Memory, ROM), a random access memory (Random Access Memory, RAM), a magnetic disk or an optical disk, or other mediums that can store program codes.

There is provided a computer device that includes a memory and a processor. A computer program is stored on the memory. The processor can call the computer program stored in the memory to implement the above method. The computer device also includes various network interfaces, power supplies and other components.

The above embodiments are described in a progressive manner. Each embodiment focuses on the differences with other embodiments, and the same or similar parts among the embodiments can be referred to each other. The description of the apparatus can be referred to the description of the method. It should be noted that any improvement and modification made by those of ordinary skill in the art without departing from the spirit of the invention should fall within the scope of the invention as defined by the appended claims.

It should also be noted that in the description, terms such as "first" and "second" are only used to distinguish one element from another, and do not imply a priority order. Moreover, the terms "include", "comprise" or any variants thereof are intended to indicate the inclusion of the following elements in non-exclusive manner.

What is claimed is:

1. An interface self-service method, comprising:
installing a self-hosted server in a local device;
installing an interface webpage in the self-hosted server in the form of a webpage expansion package;
installing an interface function in the self-hosted server in the form of a function expansion package;
confirming a type of an access request when the self-hosted server receives the access request from a local browser;
if the access request is an interface webpage request, returning a corresponding interface webpage to the local browser according to the webpage expansion package; and
if the access request is an interface function request, accessing a corresponding interface function of the function expansion package;
wherein the step of installing the interface webpage in the self-hosted server in the form of the webpage expansion package comprises:
setting an original file structure and a configuration file of the interface webpage in the webpage expansion package; and copying the webpage expansion package to the local device and installing the webpage expansion package in the self-hosted server, wherein the step of copying the webpage expansion package to the local device and installing the webpage expansion package in the self-hosted server comprises:

assigning a package base address when installing the webpage expansion package;

wherein the step of returning a corresponding interface webpage to the local browser according to the webpage expansion package comprises:

obtaining an access address according to the access request;

obtaining the package base address and a node address according to the access address;

searching for a corresponding webpage expansion package according to the package base address, and obtaining the interface webpage in the webpage expansion package according to the node address; and returning the obtained interface webpage to the local browser.

2. The method of claim 1, wherein the step of setting the original file structure and the configuration file of the interface webpage in the webpage expansion package comprises:

saving folders and files of the interface webpage in the original file structure;

saving folder nodes, file nodes, alias nodes and external event nodes of the original file structure in the configuration file in the form of tree nodes; and saving the configuration file in a top-level folder of the original file structure with a fixed file name.

3. The method of claim 2, wherein the step of setting the original file structure and the configuration file of the interface webpage in the webpage expansion package comprises:

setting loading and caching strategies in the web page expansion package, the file nodes and the folder nodes, respectively;

wherein the loading and caching strategies comprise: no caching, caching after a first access, reading and caching when the self-hosted server is started, and inheriting settings of a superior.

4. The method of claim 1, wherein the step of installing the interface function in the self-hosted server in the form of the function expansion package comprises:

registering an event handler for the function expansion package to process event processing requests of other expansion packages through the event handler.

5. The method of claim 1, wherein the accessing of the corresponding interface function of the function expansion package comprises:

accessing local files; accessing hardware of the local device; caching data required for business; pulling or pushing remote data; and accessing external webpages through channels.

6. A computer device, comprising:

a memory;

a processor; and a computer program that is stored on the memory and runs on the processor;

wherein the processor executes the computer program to implement the interface self-service method of claim 1.

7. A non-transitory computer-readable storage medium having thereon stored a computer program, wherein the computer program, when executed by a processor, causes the processor to perform the interface self-service method of claim 1.

8. An apparatus for interface self-service, comprising a processor configured for:

installing a self-hosted server in a local device;

installing an interface webpage in the self-hosted server in the form of a webpage expansion package and installing an interface function in the self-hosted server in the form of a function expansion package;

confirming a type of an access request when the self-hosted server receives the access request from a local browser;

returning a corresponding interface webpage to the local browser according to the webpage expansion package if the access request is an interface webpage request; and accessing a corresponding interface function of the function expansion package if the access request is an interface function request, wherein the processor is further configured for:

setting an original file structure and a configuration file of the interface webpage in the webpage expansion package;

copying the webpage expansion package to the local device and installing the webpage expansion package in the self-hosted server;

assigning a package base address when installing the webpage expansion package;

obtaining an access address according to the access request obtaining the package base address and a node address according to the access address;

searching for a corresponding webpage expansion package according to the package base address, and obtaining the interface webpage in the webpage expansion package according to the node address; and returning the obtained interface webpage to the local browser.

\* \* \* \* \*